(12) United States Patent
Yao (10) Patent No.: US 9,506,759 B2
(45) Date of Patent: Nov. 29, 2016

(54) ENERGY-EFFICIENT OPTIC GYROSCOPE DEVICES

(71) Applicant: Xiaotian Steve Yao, Diamond Bar, CA (US)

(72) Inventor: Xiaotian Steve Yao, Diamond Bar, CA (US)

( * ) Notice: Subject to any disclaimer, the term of this patent is extended or adjusted under 35 U.S.C. 154(b) by 597 days.

(21) Appl. No.: 14/302,358

(22) Filed: Jun. 11, 2014

(65) Prior Publication Data

US 2016/0202063 A1 Jul. 14, 2016

Related U.S. Application Data (60) Provisional application No. 61/833,622, filed on Jun. 11, 2013.

(51) Int. Cl.
*G01C 19/72* (2006.01)

(52) U.S. Cl.
CPC ........... *G01C 19/722* (2013.01); *G01C 19/727* (2013.01)

(58) Field of Classification Search
CPC ............................ G01C 19/722; G01C 19/727
See application file for complete search history.

(56) References Cited

U.S. PATENT DOCUMENTS

| | | | | |
|---|---|---|---|---|
| 4,299,490 A | * | 11/1981 | Cahill | G01C 19/726 356/464 |
| 4,329,056 A | * | 5/1982 | Lacombat | G01C 19/72 356/460 |
| 4,444,503 A | * | 4/1984 | Schiffner | G01C 19/72 356/460 |
| 4,923,299 A | * | 5/1990 | Anderson | G01C 19/727 356/470 |
| 6,400,508 B1 | | 6/2002 | Liu | |
| 8,823,946 B1 | * | 9/2014 | Logan, Jr. | G01C 19/64 356/462 |
| 2007/0296977 A1 | | 12/2007 | Madsen | |
| 2009/0116031 A1 | | 5/2009 | Schwartz et al. | |
| 2010/0290057 A1 | * | 11/2010 | Qiu | G01C 19/727 356/461 |

OTHER PUBLICATIONS

International Search Report and Written Opinion mailed on Oct. 9, 2014 for International Application No. PCT/US2014/042008, filed Jun. 1, 2014(6 pages).
Lynch, M.A., "Orthogonal Polarization Fiber Optic Gyroscope with Improved Bias Drift," Submitted to the Department of Electrical Engineering and Computer Science at the Massachusetts Institute of Technology, May 1999.

* cited by examiner

*Primary Examiner* — Michael P Lapage
(74) *Attorney, Agent, or Firm* — Perkins Coie LLP (57) ABSTRACT

Optical gyroscope devices and methods based on optical interferometric configurations to minimize optical loss and enhance the device energy efficiency. In one implementation, optical polarization control is provided in an optical gyroscope to reduce the optical loss in routing light to and from an optical ring that senses the rotation.

20 Claims, 12 Drawing Sheets

ENERGY-EFFICIENT OPTIC GYROSCOPE DEVICES

CROSS REFERENCE TO RELATED APPLICATIONS

This patent document claims the benefit of priority of U.S. Provisional Patent Application No. 61/833,633 entitled "ENERGY-EFFICIENT OPTIC GYROSCOPE DEVICES" and filed on Jun. 11, 2013. The entire content of the before-mentioned patent application is incorporated by reference as part of the disclosure of this document.

BACKGROUND

This patent document relates to optical gyroscopes for optically sensing rotation.

Sensing of rotation can be used in a wide range of applications, including, e.g., navigation, motion sensing, motion control including object stability control, game console controllers, hand-held devices such as smartphones. Optical gyroscopes can be designed to use rotation-induced changes in the optical interference pattern of two counter-propagating optical beams to measure the rotation. Many optical gyroscopes are based on an optical Sagnac interferometer configuration including various interferometric fiber-optic gyroscopes (IFOGs). Such optical gyroscopes can be designed without moving parts and thus eliminate the wear and tear in other gyroscopes with an oscillating proof mass or a moving component. IFOGs are commercialized and in mass production and can be used in various military and civilian applications, including applications for aircrafts, vessels, and land vehicles for precision rotation rate and angle detection.

Figure 1:
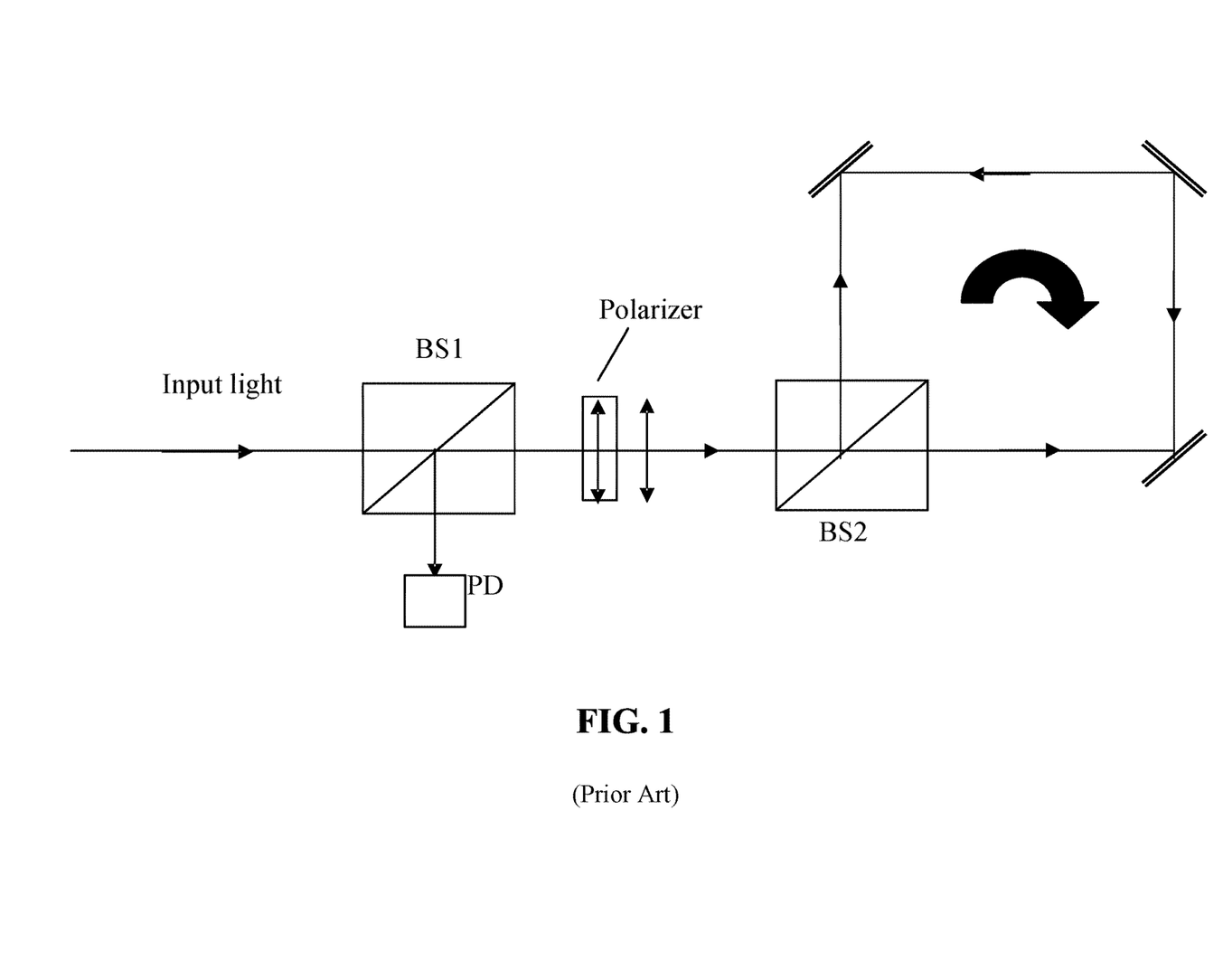
FIG. 1 shows an example of an optical gyroscope based on a bulk interferometric design.

FIG. 1 shows an example of an optical gyroscope based on a Sagnac interferometer formed by an optical ring loop in free space with reflectors and in an optical fiber loop, respectively. The Sagnac interferometer in FIG. 1 uses an input beam splitter (BS1) to receive input light for the Sagnac interferometer and to direct the returned light from the Sagnac interferometer into the photodetector (PD) for detecting the interference signal caused by the Sagnac interferometer. A second beam splitter (BS2) is coupled to the optical ring loop of the Sagnac interferometer as shown to produce two counter propagating beams. An optical polarizer is placed between the two BS devices BS1 and BS2 to insure the polarization of the light at the second BS (BS2) to provide an equal splitting of the optical power between the two optical beams coupled into the optical ring loop. The second BS2 splits the polarized input light into two counter propagating beams having light in the same polarization in the optical ring loop and the two counter propagating beams are recombined at the same BS (BS2) to optically interfere with each other due to the presence of light in the same polarization in the two beams. A portion of this recombined light at the BSs with the optical interference information is directed into the first BS (BS1) which directs at least a portion of the recombined light into the PD for detection. To increase the sensitivity and reliability, the optical ring loop can be designed to have a long ring loop length. For example, a relatively long length of fiber coil (e.g., hundreds to thousands meters of fiber) may be used to form the optical ring loop.

SUMMARY

This document includes, among others, optical gyroscope designs with low optical loss. Optical gyroscope devices and methods are provided based on optical interferometric configurations to minimize optical loss and enhance the device energy efficiency. In one implementation, optical polarization control is provided in an optical gyroscope to reduce the optical loss in routing light to and from an optical ring that senses the rotation.

In one aspect, a method is provided for operating an optical gyroscope for sensing rotation experienced by an optical ring. This method includes operating a first optical polarization selective device to receive input light in an input optical polarization to output as output light without significant loss; using a polarization rotation device to receive the output light from the first optical polarization device to rotate polarization of the received light by 45 degrees to produce polarization rotated light; placing a second optical polarization selective device to receive the polarization rotated light from the polarization rotation device to split the polarization rotated light into a first optical beam in a first optical polarization and a second optical beam in a second optical polarization that is orthogonal to the first optical polarization; coupling an optical ring loop to the second optical polarization selective device to include a first fiber loop end to receive the first optical beam to propagate in the optical fiber loop in a first loop direction and a second fiber loop end to receive the second optical beam to propagate in the optical loop in a second loop direction opposite to the first loop direction; configuring the optical ring loop and the second optical polarization selective device to enable recombining the first and second optical beams from the optical ring loop after propagating through the optical ring loop as a returned beam carrying information indicating a rotation experienced by the optical ring loop and in a polarization that is the same as a polarization of the polarization rotated light to pass through the polarization rotation device to reach the first optical polarization selective device which directs the returned beam as an output beam without significant loss; using an optical detector to receive the output beam from the first optical polarization selective device and configured to produce a detector signal from the received output beam; and processing the detector signal to extract the rotation experienced by the optical ring loop.

In another aspect, an optical gyroscope is provided for sensing rotation experienced by an optical ring and includes a first optical polarization selective device that receives input light in an input optical polarization to output as output light without significant loss; a polarization rotation device located to receive the output light from the first optical polarization device to rotate polarization of the received light by 45 degrees to produce polarization rotated light; a second optical polarization selective device located to receive the polarization rotated light from the polarization rotation device to split the polarization rotated light into a first optical beam in a first optical polarization and a second optical beam in a second optical polarization that is orthogonal to the first optical polarization; and an optical ring loop coupled to the second optical polarization selective device to include a first fiber loop end to receive the first optical beam to propagate in the optical fiber loop in a first loop direction and a second fiber loop end to receive the second optical beam to propagate in the optical loop in a second loop direction opposite to the first loop direction. The optical ring loop and the second optical polarization selective device are coupled to enable recombining the first and second optical beams from the optical ring loop after propagating through the optical ring loop as a returned beam carrying information indicating a rotation experienced by the optical ring loop and in a polarization that is the same as a polarization of the polarization rotated light to pass through the polarization rotation device to reach the first optical polarization selective device which directs the returned beam as an output beam without significant loss. This device also includes an optical detector located to receive the output beam from the first optical polarization selective device and configured to produce a detector signal from the received output beam; and a processing device that receives and processes the detector signal to extract the rotation experienced by the optical ring loop.

The above aspects and their implementations are described in greater detail in the drawings, the description and the claims.

BRIEF DESCRIPTION OF DRAWINGS

FIGS. 4A and 4B show a second example of an optical gyroscope based on an energy efficient design, where the device in FIG. 4A can be used as a lossless fiber optic gyroscope (FOG) using cubic polarization beam splitters. The light source can also be integrated inside the dotted box in a chip format to reduce the size and cost. In this case, no PM fiber pigtail is required for the light source. FIG. 4B shows an example of the relative orientation between the PBS and the wave plate. Both PBS1 and PBS have the same orientation (x,y), while the wave plate's slow and fast axes (s,f) are preferably aligned 45 degrees from the PBS axes. If a Faraday rotator is used, its orientation in the (x,y) plane does not need to be defined. Two polarizing fiber pigtails can be used to replace the two PM fiber pigtails for better performance.

FIGS. 5A and 5B show a third example of an optical gyroscope based on an energy efficient design, where the device in FIG. 5A can be used as a lossless fiber optic gyroscope (FOG). The light source can also be integrated inside the dotted box in a chip format to reduce the size and cost. In this case, no PM fiber pigtail is required for the light source.

FIGS. 6A and 6B show a fourth example of an optical gyroscope based on an energy efficient design, where the device in FIG. 6A can be used as a lossless fiber optic gyroscope (FOG). A low cost compact disk laser or a VCSEL laser can be integrated inside the same package. The laser is preferably operating below threshold for low coherence length operation.

FIGS. 7A and 7B show a fifth example of an optical gyroscope based on an energy efficient design, where the device in FIG. 7A can be used as a lossless fiber optic gyroscope (P-FOG).

DETAILED DESCRIPTION

This patent document discloses techniques and devices for optical sensing of rotation based on optical efficient optical designs for reducing optical loss in coupling light to and from an optical ring loop. Optical gyroscopes can be constructed based on the disclosed energy-efficient designs for a wide range of applications, including but not limited to applications in aircrafts, vessels, and land vehicles and applications in various sensors and devices such as hand-held communication devices like tablets and smartphones, game controllers and others for precision rotation rate and angle detection.

Figure 2:
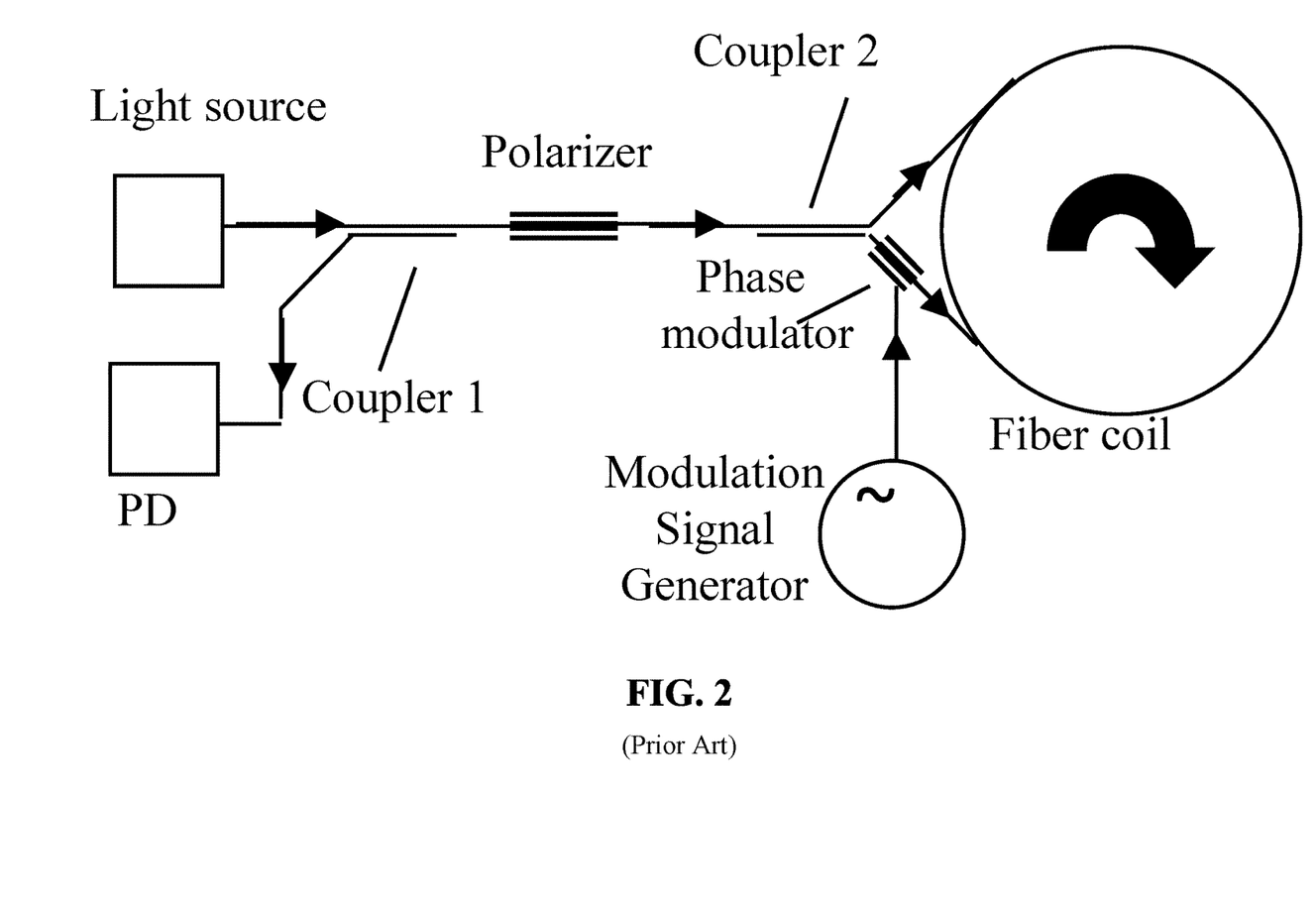
FIG. 2 shows an example of an optical gyroscope based on a fiber interferometric design.

FIG. 2 shows an example of an IFOG based on the same optical design in FIG. 1 with a fiber loop that uses a phase modulation mechanism in the fiber loop to bias the gyro at a most sensitive point, and a closed loop circuit that is used for the signal detection to increase IFOG's dynamic range and improve its detection sensitivity. The two fiber couplers, coupler 1 and coupler 2, are shown in FIG. 2 and are insensitive to optical polarization. In operation, the two fiber couplers split light or combine light independent of the optical polarization of light. Optical gyroscopes based on a Sagnac interferometer can be implemented in other configurations and such configurations, like the examples in FIGS. 1 and 2, rely on optical interference of the two counter propagating beams in the optical ring loop to measure the rotation of the optical ring loop.

One of the major problems of the interferometric optic gyroscopes as shown in FIGS. 1 and 2 and other designs is the high insertion loss. Input light from the light source passing through the first beam splitter BS1 in FIG. 1 (or the first coupler 1 in FIG. 2) suffers a minimum of 3 dB loss. After returning from the second beam splitter BS2 or the second coupler 2 and passing through the first beam splitter BS1 or the first coupler 1 for the second time, the optical power will lose at least another 3 dB. At the photodetector, the total optical loss in the device is at least 6 dB, assuming all the optical components are lossless. In practice, there will be about 9 dB or more total optical loss in various devices, assuming each of the beam splitters (or couplers) and the polarizer has an excess loss of 0.5 dB. Such a high loss puts a higher power requirement on the light source, resulting higher cost and higher electrical power consumption.

The energy-efficient optic gyroscope designs disclosed here can be implemented for constructing an optical gyroscope with essentially no optical loss when light passes from the light source to the photodetector, assuming all the optical components are lossless.

Figure 3:
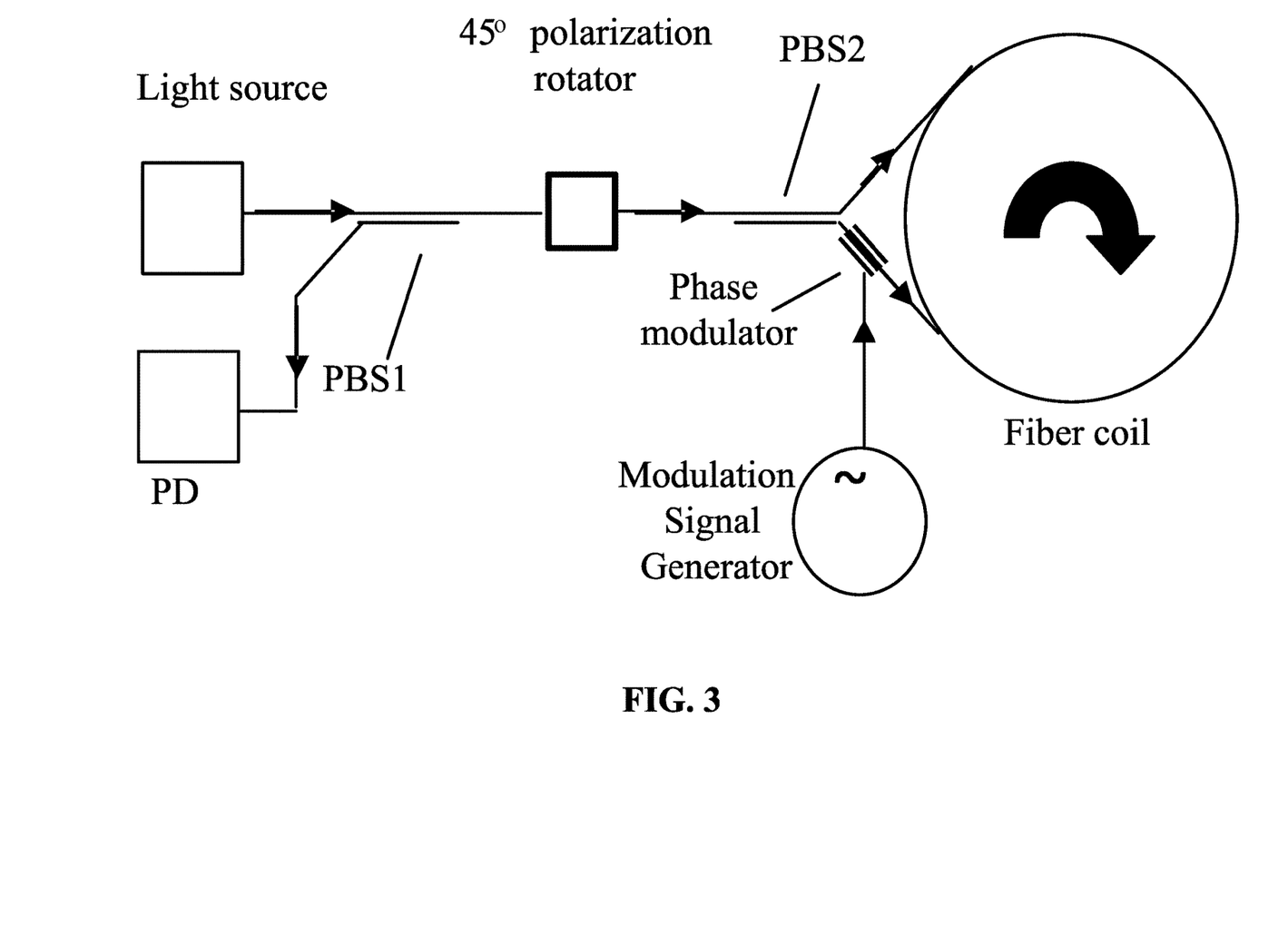
FIG. 3 shows an example of an optical gyroscope based on an energy efficient design.

FIG. 3 shows an example of such designs where polarization beam splitters (PBS1 and PBS2) are used to replace the polarization insensitive beam splitters or couplers in FIGS. 1 and 2 and a polarization rotator is inserted in the optical path in between the two PBS devices PBS1 and PBS2. The second PBS PBS2 functions both as the beam splitter to split lights into counter propagating directions in the optical ring loop and as an optical polarizer to suppress the unwanted polarization coupling in the fiber coil. With this configuration, the optical loss can be reduced at least 6 dB in comparison with the designs in FIGS. 1 and 2. Taking into account of at least 0.5 dB optical loss in each of the two PBS and the polarization rotator in many practical devices, the design in FIG. 3 enables the power requirement of the light source to be reduced by 9 dB in comparison with the power requirement for the light sources in the gyroscope designs in FIGS. 1 and 2. The counter propagating beams are from orthogonal polarization components. A phase modulator is provided in the optical ring loop here for biasing the gyro to the most sensitive operation point, just as in an IFOG. The signal detection and processing in the current designs may be implemented in various configurations, including processing circuitry similar to that in the IFOG.

Figure 4A:
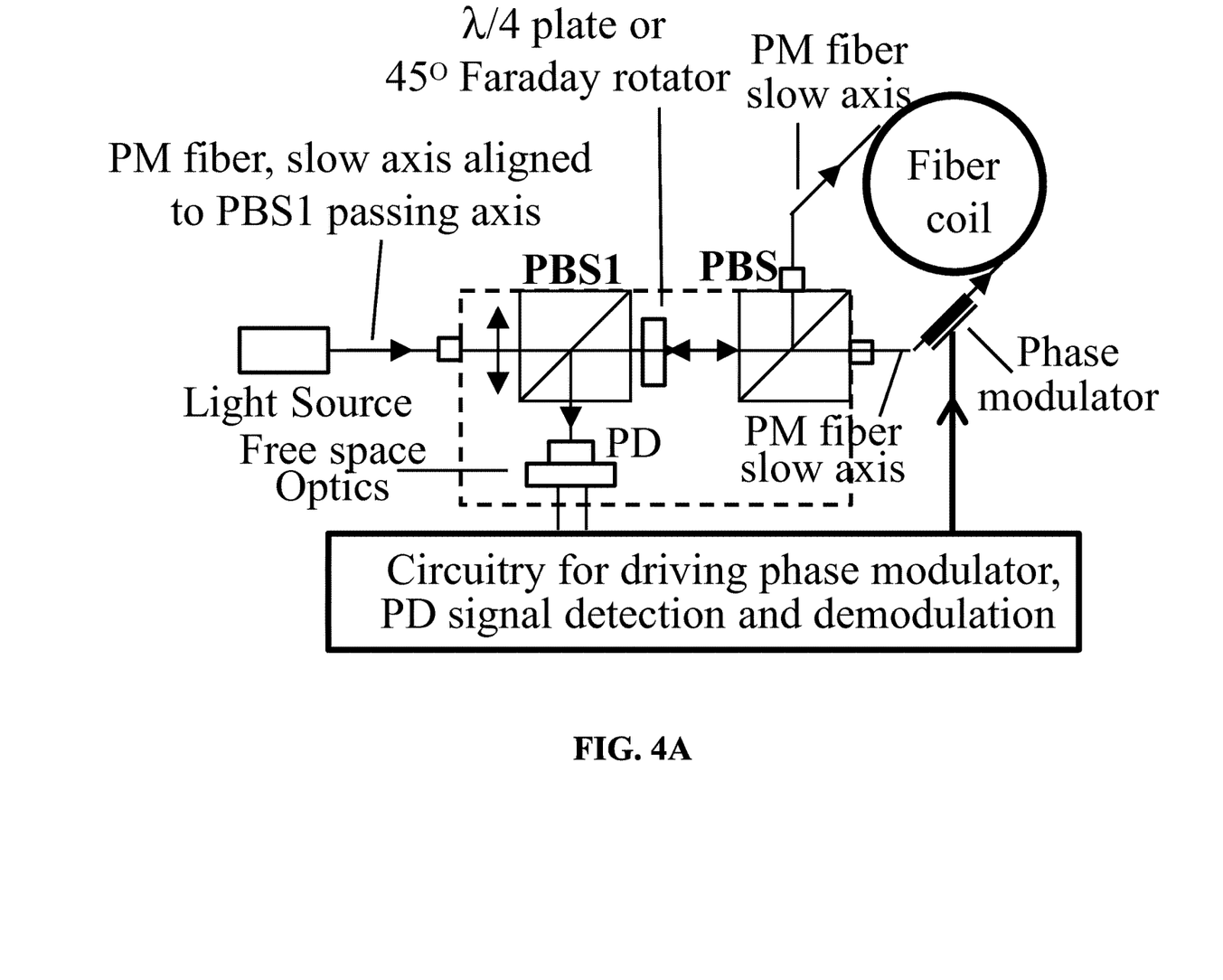
Figure 4B:
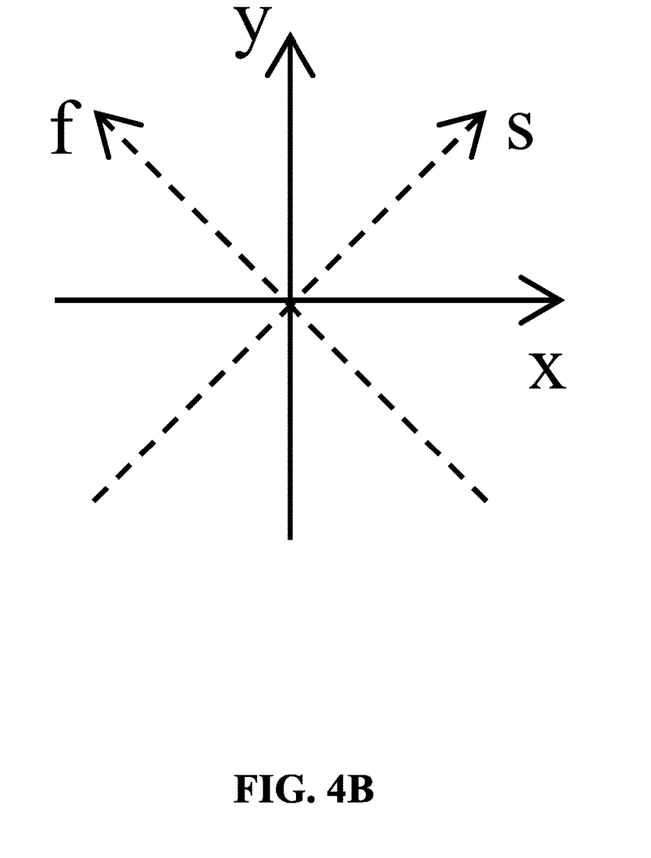

FIG. 4A shows a first implementation of the energy-efficient optical gyroscope design in FIG. 3, where bulk PBS cubes are used. These cubes can be made with dielectric coatings or birefringence crystals. Polarization maintaining (PM) fiber is used in routing light in FIG. 4A. The passing axes or eigen axes of the two PBS cubes are aligned. The polarization rotator can either be a half wave plate oriented 45 degrees from the passing axis of the first PBS or a 45-degree Faraday rotator so that the two outputs from the second PBS have the same power. Both outputs from the second PBS are coupled into the slow (or fast) axis of two polarization maintaining (PM) fiber pigtails of the fiber coil so that they can be recombined into the same optical path without loss after propagating around the fiber coil. After passing through the wave plate or the Faraday rotator, the polarization will be rotated 90 degrees with respect to the input polarization at the first PBS and will be directed to the third port of the first PBS without loss, before finally entering into a photodetector. FIG. 4B shows the relative orientation between the PBS and the wave plate. Both PBS1 and PBS have the same orientation (x,y), while the wave plate's slow and fast axes (s,f) are preferably aligned 45 degrees from the PBS axes. If a Faraday rotator is used, its orientation in the (x,y) plane does not need to be defined. A circuit is provided to drive the phase modulator, to process the PD signal detection and to perform the demodulation as part of the gyroscope signal processing to determine the rotation of the optical loop formed by the fiber coil.

The electric field of the optical bean before entering the first PBS in FIG. 4A can be written as:

$$\vec{E}_{in} = E_0 \hat{v} = (E_0/\sqrt{2})(\hat{s}+\hat{f}) \quad (1)$$

where $\hat{x}$ and $\hat{y}$ denote two passing axes or principal axes of the first PBS, and $\hat{s}$ and $\hat{f}$ are the slow and fast axes of the wave plate. After passing through the wave plate, the electric field becomes:

$$\vec{E}_{wp1} = (E_0/\sqrt{2})(\hat{s}+\hat{f}e^{i\phi_p}) = (E_0/2)[(1-e^{i\phi_p})\hat{x}+(1+e^{i\phi_p})\hat{y}] \quad (2)$$

After the two beams of orthogonal polarizations are separated as two separate beams by the second PBS as two counter-propagating beams into the optical loop, and, after going around the optical loop, are recombined at the second PBS, the electric field of the recombined beam at the second PBS is:

$$\vec{E}_{PBS2} = (E_0/2)[(1-e^{i\phi_p})\hat{x}+(1+e^{i\phi_p})e^{i\Delta\phi}\hat{y}] \quad (3)$$

where $\Delta\phi$ is the phase difference between the counter-propagating beams caused by the physical rotation of the optical loop, as in an interferometric optic gyro. This phase difference caused by the rotation of the optical loop can be expressed as:

$$\Delta\phi = 2\pi DGD/\lambda_0 = (4\pi A/\lambda_0 c)\omega, \quad (4)$$

where A is the area enclosed by the light beams, $\lambda_0$ is the center wavelength, c is the speed of light, and $\omega$ is the rotation rate. It is assumed that there is no other differential phase shift between the two polarization components when they propagate around the loop.

After the recombined beam goes through the wave plate for the second time, the electric field of the recombined beam at the output of the wave plate is $$\vec{E}_{wp2} = (E_0/4)[(1-e^{i2\phi_p})(1+e^{i\Delta\phi})\hat{x}+ (1+e^{i2\phi_p})(1+e^{i\Delta\phi})\hat{y}-2(1-e^{i\Delta\phi})e^{i\phi_p}\hat{y}] \quad (5)$$

For a quarter wave plate, $\phi_p = \pi/2$, Eq. (5) becomes:

$$\vec{E}_{wp2} = (E_0/2)[(1+e^{i\Delta\phi})\hat{x}-(1-e^{i\Delta\phi})\hat{y}] \quad (6)$$

The optical powers at x and y directions of the optical beam output by the quarter wave plate after the final passing through the first PBS are:

$$P_x = |\vec{E}_{wp2} \cdot \hat{x}|^2 = (E_0^2/2)(1+\cos\Delta\phi) \quad (7)$$

$$P_y = |\vec{E}_{wp2} \cdot \hat{y}|^2 = (E_0^2/2)(1-\cos\Delta\phi) \quad (8)$$

When there is no rotation in the optical loop, $\Delta\phi=0$, $P_y=0$, and $P_x=E_0^2$, indicating that all the optical power reaches the photodetector without any loss. The expression of Eq. (7) is the same as that for an IFOG. In order for the detected signal to be most sensitive to the rotation induced phase $\Delta\phi$, a phase modulation is provided in the optical loop to bias this optic gyro at the quadrature, exactly the same as in an IFOG. With this phase modulator, both open-loop and closed loop fiber gyro configurations can be achieved, just as an IFOG. The advantage of the design in FIG. 4 is the reduced optical loss and the 6-dB power saving by reducing the overall signal loss by 6 dB. To increase the extinction ratio, two optical polarizers can be placed at the two output faces of the second PBS before the fiber pigtails. Alternatively, two polarizing fiber pigtails can be used to replace the PM fiber pigtails in FIG. 4A. The polarizing fiber segments are coupled between the optical ring loop and the second PBS, each polarizing fiber segment is structured to guide light in a selected polarization direction.

Figure 5A:
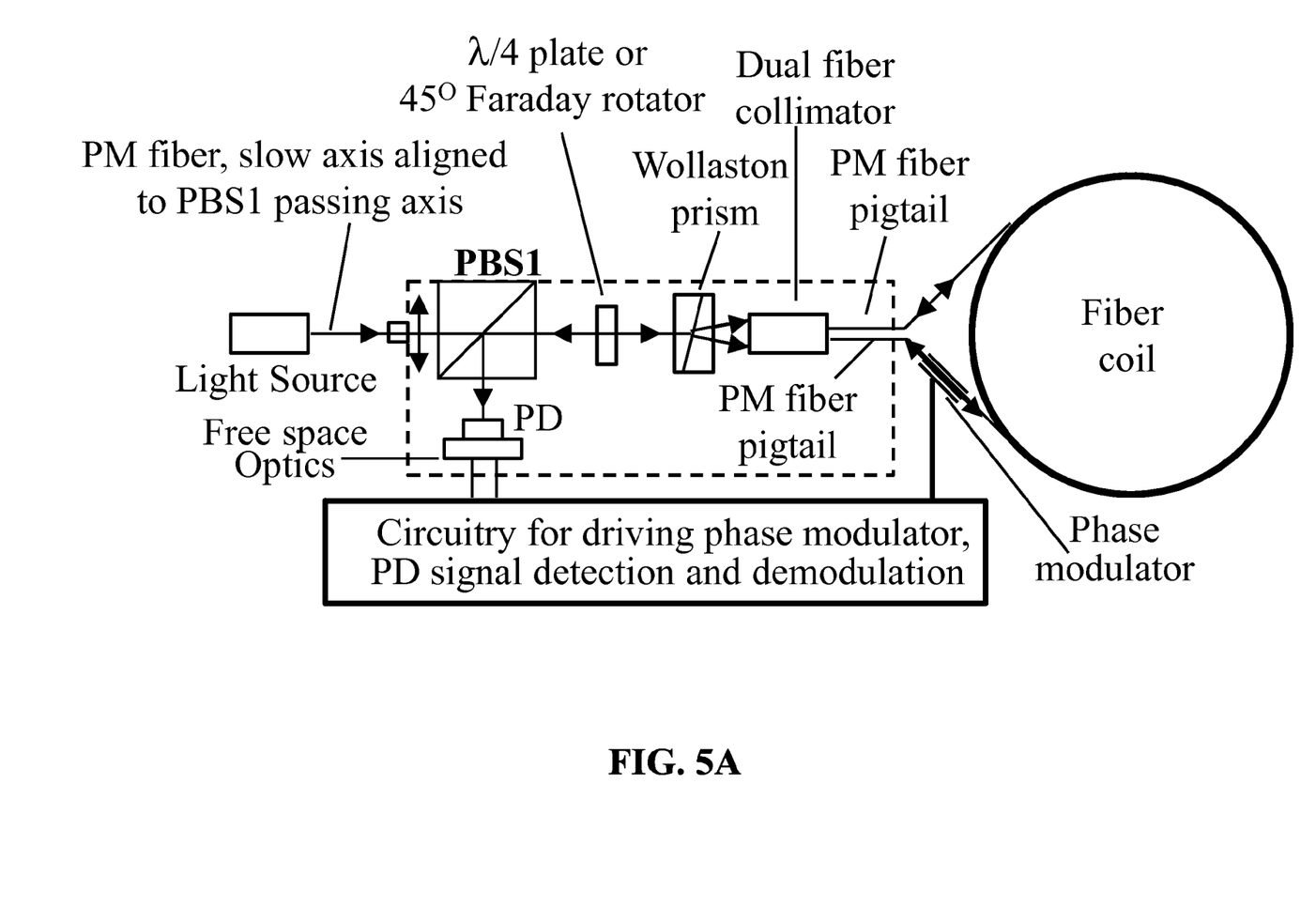
Figure 5B:
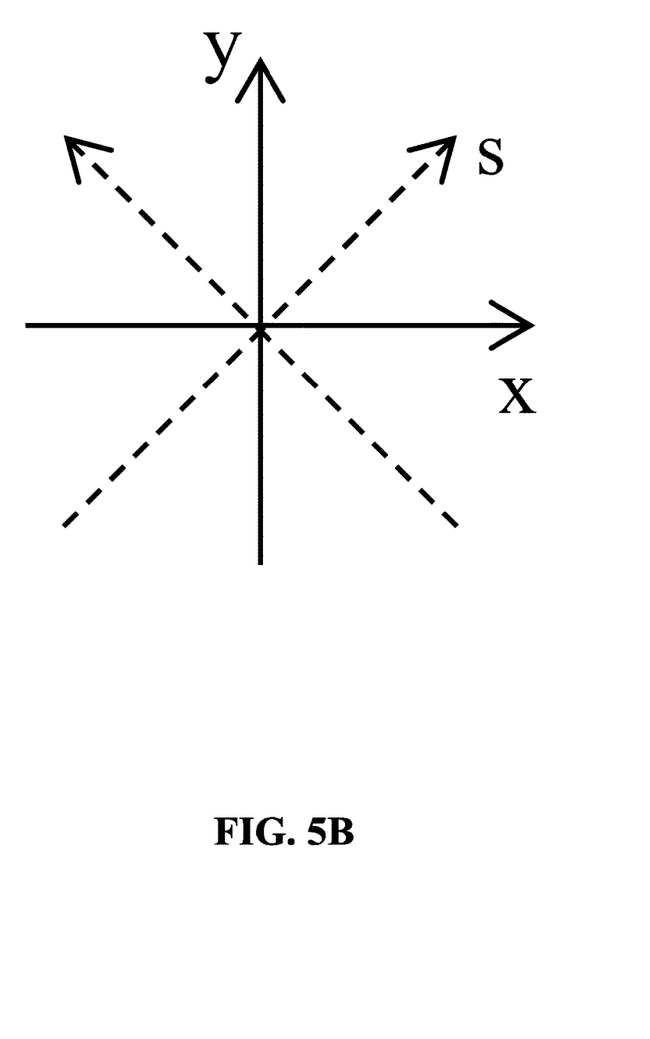
FIG. 5B shows an example of the relative orientation between the PBS, the Wollaston prism and the wave plate. Both PBS1 and the Wollaston prism have the same orientation (x,y), while the wave plate's slow and fast axes (s,f) are preferably aligned 45 degrees from the PBS axes. If a Faraday rotator is used, its orientation in the (x,y) plane does not need to be defined. Two polarizing fiber pigtails can be used to replace the two PM fiber pigtails for better performance.

FIG. 5A shows a second implementation of the energy-efficient design in FIG. 3, where the second PBS (PBS2) in FIG. 4A is replaced with a Wollaston prism for increased polarization extinction ratio and reduced size. A dual fiber collimator is placed at the output side of the prism to focus beams of orthogonal polarizations into two PM fibers aligned with the slow axis. FIG. 5B shows the relative orientation between the PBS1, the Wollaston prism and the wave plate. Both PBS1 and the Wollaston prism have the same orientation (x,y), while the wave plate's slow and fast axes (s,f) are aligned 45 degrees from the PBS axes. If a Faraday rotator is used, its orientation in the (x,y) plane does not need to be defined. As in FIG. 4A, two polarizing fiber pigtails can be used to replace the two PM fiber pigtails for increased polarization extinction ratio and better performance.

Figure 6A:
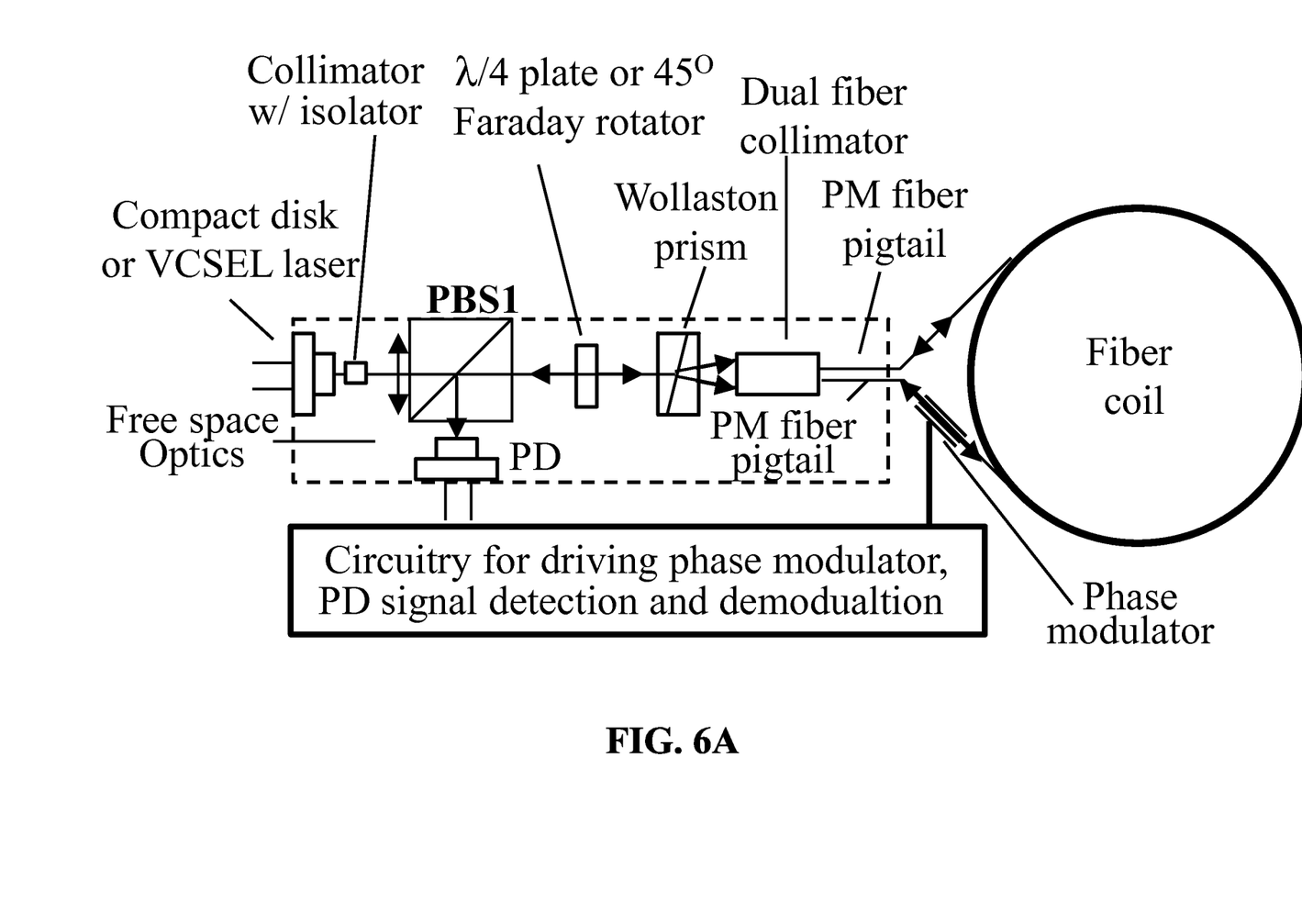
Figure 6B:
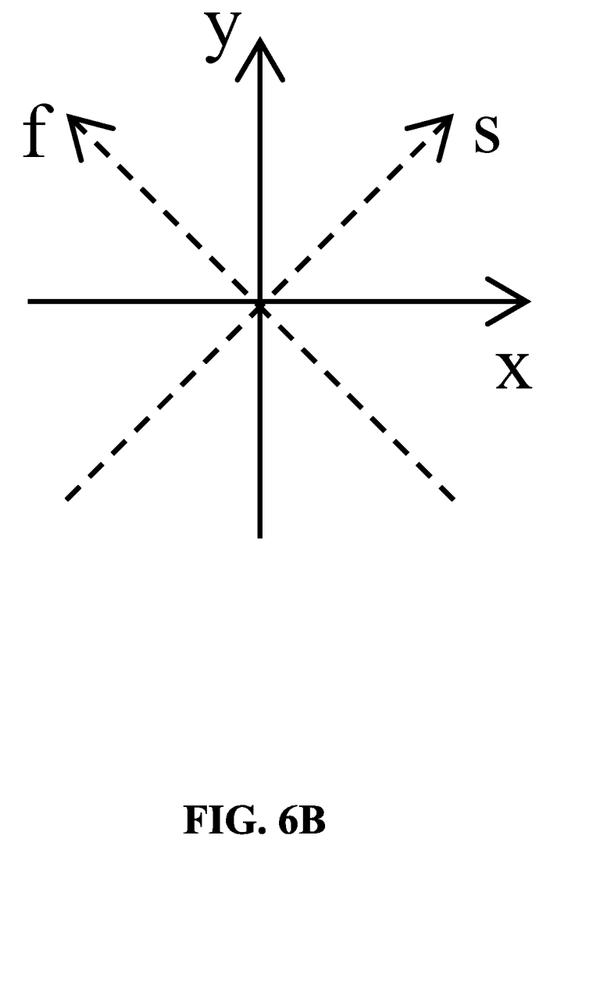
FIG. 6B shows an example of the relative orientation between the PBS, the Wollaston prism and the wave plate. Both PBS1 and the Wollaston prism have the same orientation (x,y), while the wave plate's slow and fast axes (s,f) are preferably aligned 45 degrees from the PBS axes. If a Faraday rotator is used, its orientation in the (x,y) plane does not need to be defined. Two polarizing fiber pigtails can be used to replace the two PM fiber pigtails for better performance.

FIG. 6A shows a third implementation of the energy-efficient design in FIG. 3, where a low cost laser, such as a compact disk laser or a VCSEL laser in a TO46 or similar package, is integrated into the same package as the rest of the optical components in the dotted box. The laser can be operated by controlling the driving current to the laser below the lasing threshold current to ensure short coherence length for better gyro performance, as in operating an IFOG. Because of the low optical power for a laser operating below the lasing threshold, the lossless configuration disclosed here is particularly energy efficient. The two polarizing fiber pigtails can be used to replace the two PM fiber pigtails for increased polarization extinction ratio and better performance.

Figure 7A:
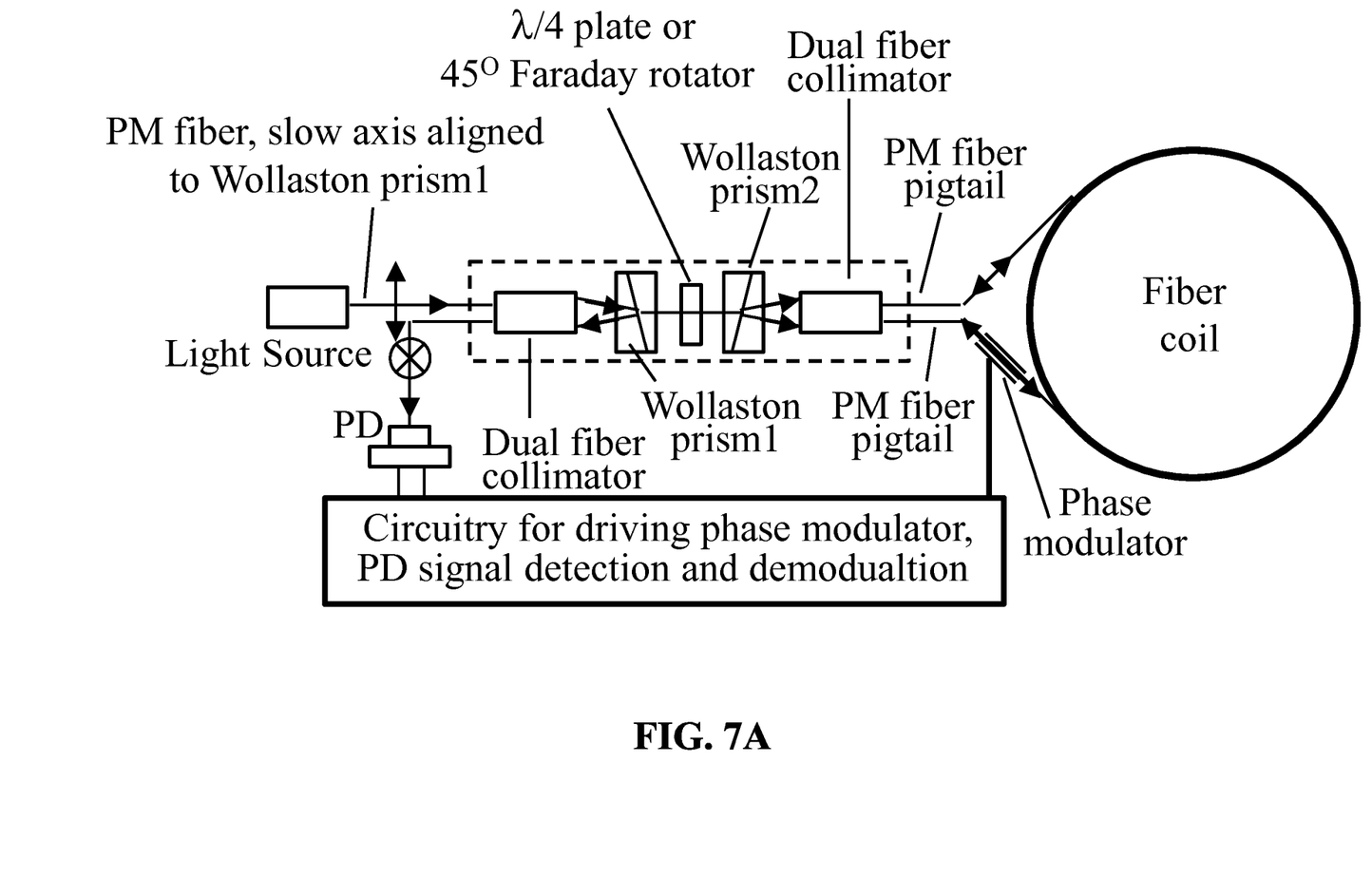
Figure 7B:
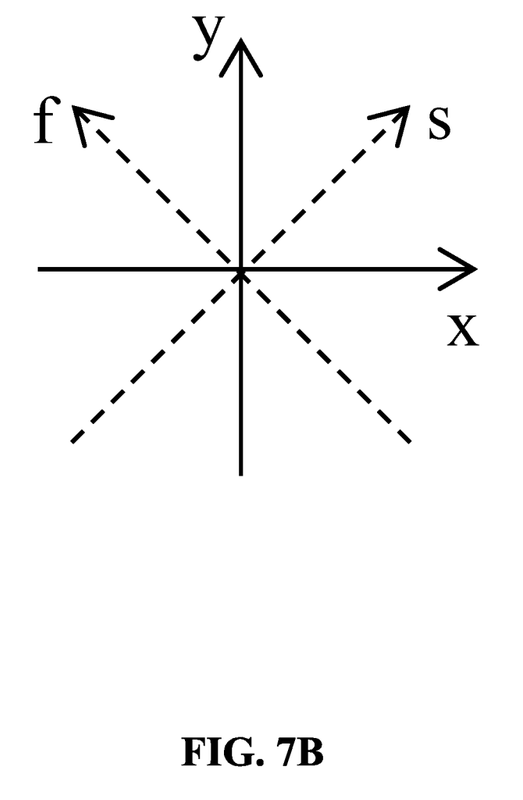
FIG. 7B shows an example of the relative orientation between the two Wollaston prisms and the wave plate. Both Wollaston prisms have the same orientation (x,y), while the wave plate's slow and fast axes (s,f) are preferably aligned 45 degrees from the Wollaston prism axes. If a Faraday rotator is used, its orientation in the (x,y) plane does not need to be defined.

FIG. 7A shows a third implementation of the energy-efficient design in FIG. 3, where both PBS in FIG. 4A are replaced with Wollaston prisms to further reduce the size of the device. The whole optics package containing the two Wollaston prisms, the two dual fiber collimators, and the polarization rotator can be less than, e.g., 3 mm (diameter)× 15 mm (length). The total practical loss can be controlled to be less than 2 dB, assuming each pair of prism and collimator has a single trip loss less than 0.4 dB and the polarization rotator has a single trip loss less than 0.1 dB in free space. FIG. 7B shows the relative orientation between the two Wollaston prisms and the wave plate. Both Wollaston prisms have the same orientation (x,y), while the wave plate's slow and fast axes (s,f) are preferably aligned 45 degrees from the Wollaston prism axes. If a Faraday rotator is used, its orientation in the (x,y) plane does not need to be defined. Similarly, two polarizing fiber pigtails can be used to replace the two PM fiber pigtails at the right hand side for increased polarization extinction ratio and better performance.

Figure 8:
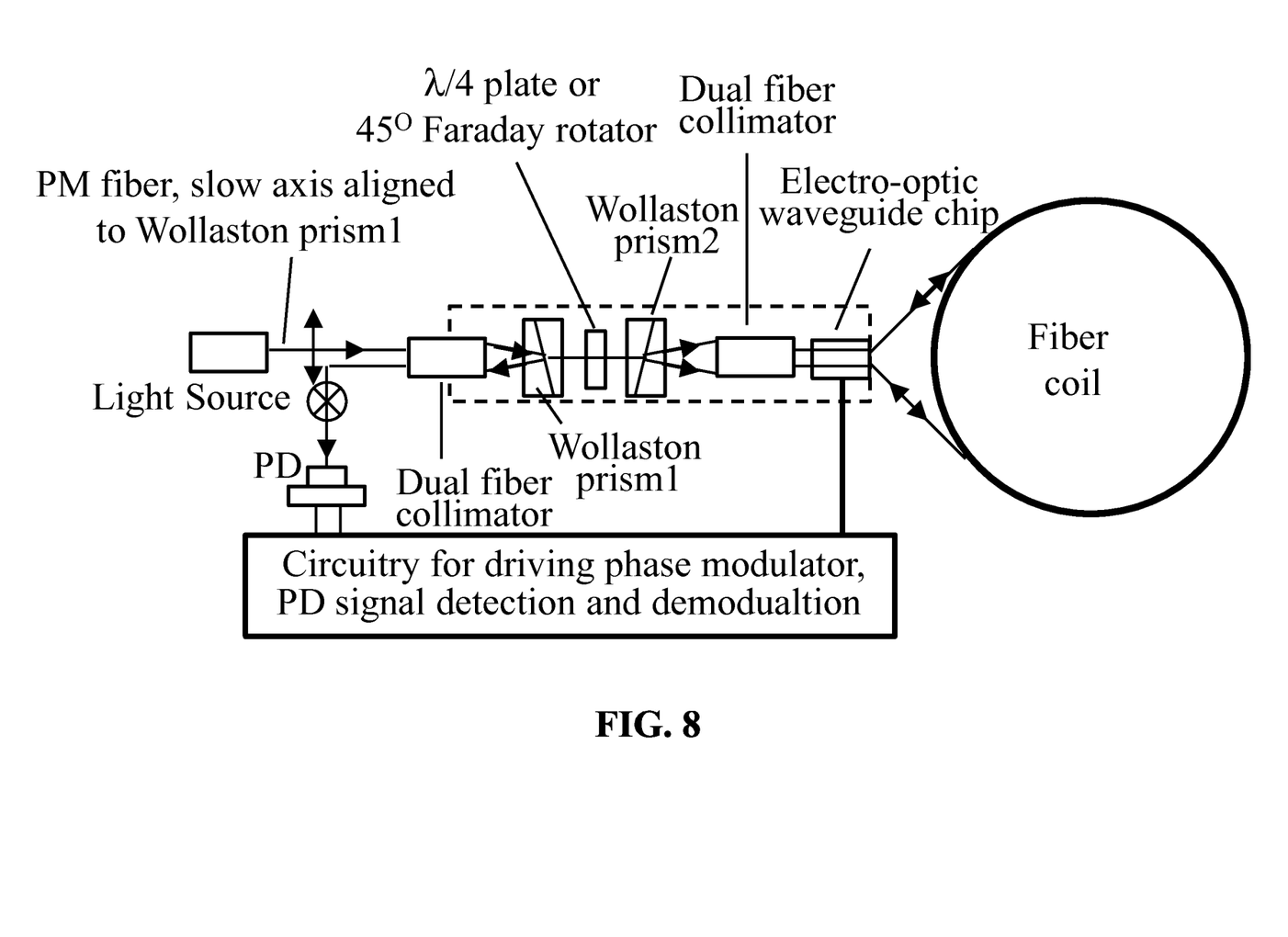
FIG. 8 shows an example of a lossless fiber optic gyroscope (P-FOG) sharing some common features with the design in FIGS. 7A and 7B and implementing an electro-optic waveguide chip to receive light from the second Wollaston prism.

FIG. 8 illustrates a fourth implementation of the energy-efficient design in FIG. 3. Various features in FIG. 8 are similar to the design of FIG. 7. A waveguide device coupled between the optical ring loop and the second Wollaston prisms as the second optical polarization selective device and is configured to exhibit an electro-optic effect to cause a phase modulation in response to an electrical modulation control signal applied to the waveguide device. This electro-optic waveguide device can be configured in form of a waveguide chip made with an electro-optic material, such as LiNbO$_3$ to act as a phase modulator under a control of an electrical modulation control signal. For example, a highly polarizing waveguide made with a proton exchange process may be used.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is what is described and illustrated, including:

1. An optical gyroscope for sensing rotation experienced by an optical ring, comprising:
   a first optical polarization selective device that receives input light in an input optical polarization to output as output light;
   a polarization rotation device located to receive the output light from the first optical polarization device to rotate polarization of the received light by 45 degrees to produce polarization rotated light;
   a second optical polarization selective device located to receive the polarization rotated light from the polarization rotation device to split the polarization rotated light into a first optical beam in a first optical polarization and a second optical beam in a second optical polarization that is orthogonal to the first optical polarization;
   an optical ring loop coupled to the second optical polarization selective device to include a first fiber loop end to receive the first optical beam to propagate in the optical fiber loop in a first loop direction and a second fiber loop end to receive the second optical beam to propagate in the optical loop in a second loop direction opposite to the first loop direction, wherein the optical ring loop and the second optical polarization selective device are coupled to enable recombining the first and second optical beams from the optical ring loop after propagating through the optical ring loop as a returned beam carrying information indicating a rotation experienced by the optical ring loop and in a polarization that is the same as a polarization of the polarization rotated light to pass through the polarization rotation device to reach the first optical polarization selective device which directs the returned beam as an output beam;
   an optical detector located to receive the output beam from the first optical polarization selective device and configured to produce a detector signal from the received output beam; and
   a processing device that receives and processes the detector signal to extract the rotation experienced by the optical ring loop.

2. The optical gyroscope as in claim 1, wherein:
the first and second polarization selective devices are polarization beam splitters.

3. The optical gyroscope as in claim 1, wherein:
the polarization rotation device includes a quarter wave plate.

4. The optical gyroscope as in claim 1, wherein:
the polarization rotation device includes a 45-degree Faraday polarization rotator.

5. The optical gyroscope as in claim 1, wherein:
the optical ring loop is formed by an optical fiber loop.

6. The optical gyroscope as in claim 5, wherein:
two ends of the optical fiber loop are coupled to the second optical polarization selective device to receive the first and second optical beams along a common polarization axis of the fiber loop.

7. The optical gyroscope as in claim 5, wherein:
the optical fiber loop includes a polarization maintaining fiber and the second optical polarization selective device is coupled to output the first optical beam with the first optical polarization aligned with a slow axis of a first end of the polarization maintaining fiber and the second optical beam with the second optical polarization aligned with a slow axis of a second end of the polarization maintaining fiber.

8. The optical gyroscope as in claim 1, comprising:
an optical bias device in the optical ring loop to cause a phase bias in the returned beam that is sensitive to a phase caused by the rotation of the optical ring loop.

9. The optical gyroscope as in claim 1, wherein:
one of the first and second optical polarization selective devices includes a Wollaston prism that outputs two beams in two orthogonal polarizations and a dual fiber collimator having two fibers that are respectively coupled to the Wollaston prism to receive the two beams, and
another one of the first and second optical polarization selective devices includes a polarization beam splitter.

10. The optical gyroscope as in claim 1, wherein:
each of the first and second optical polarization selective devices includes a Wollaston prism that outputs two beams in two orthogonal polarizations and a dual fiber collimator having two fibers that are respectively coupled to the Wollaston prism to receive the two beams.

11. The optical gyroscope as in claim 1, further comprising:
polarizing fiber segments coupled between the optical ring loop and the second optical polarization selective device, each polarizing fiber segment structured to guide light in a selected polarization direction.

12. The optical gyroscope as in claim 1, further comprising:
a waveguide device coupled between the optical ring loop and the second optical polarization selective device and configured to exhibit an electro-optic effect to cause a phase modulation in response to an electrical modulation control signal applied to the waveguide device.

13. A method for operating an optical gyroscope for sensing rotation experienced by an optical ring, comprising:
operating a first optical polarization selective device to receive input light in an input optical polarization to output as output light;
operating a polarization rotation device to receive the output light from the first optical polarization device to rotate polarization of the received light by 45 degrees to produce polarization rotated light;
placing a second optical polarization selective device to receive the polarization rotated light from the polarization rotation device to split the polarization rotated light into a first optical beam in a first optical polarization and a second optical beam in a second optical polarization that is orthogonal to the first optical polarization;
coupling an optical ring loop to the second optical polarization selective device to include a first fiber loop end to receive the first optical beam to propagate in the optical fiber loop in a first loop direction and a second fiber loop end to receive the second optical beam to propagate in the optical loop in a second loop direction opposite to the first loop direction;
configuring the optical ring loop and the second optical polarization selective device to enable recombining the first and second optical beams from the optical ring loop after propagating through the optical ring loop as a returned beam carrying information indicating a rotation experienced by the optical ring loop and in a polarization that is the same as a polarization of the polarization rotated light to pass through the polarization rotation device to reach the first optical polarization selective device which directs the returned beam as an output beam;
using an optical detector to receive the output beam from the first optical polarization selective device and configured to produce a detector signal from the received output beam; and
processing the detector signal to extract the rotation experienced by the optical ring loop.

14. The method as in claim 13, wherein:
the first and second polarization selective devices are polarization beam splitters.

15. The method as in claim 13, wherein:
the polarization rotation device includes a quarter wave plate.

16. The method as in claim 13, wherein:
the polarization rotation device includes a 45-degree Faraday polarization rotator.

17. The method as in claim 13, wherein:
the optical ring loop is formed by an optical fiber loop.

18. The method as in claim 15, comprising:
coupling two ends of the optical fiber loop to the second optical polarization selective device to receive the first and second optical beams along a common polarization axis of the optical fiber loop.

19. The method as in claim 15, wherein:
the optical fiber loop includes a polarization maintaining fiber and the second optical polarization selective device is coupled to output the first optical beam with the first optical polarization aligned with a slow axis of a first end of the polarization maintaining fiber and the second optical beam with the second optical polarization aligned with a slow axis of a second end of the polarization maintaining fiber.

20. The method as in claim 13, comprising:
causing a phase bias in the returned beam that is sensitive to a phase caused by the rotation of the optical ring loop.

* * * * *